Patented Jan. 2, 1951

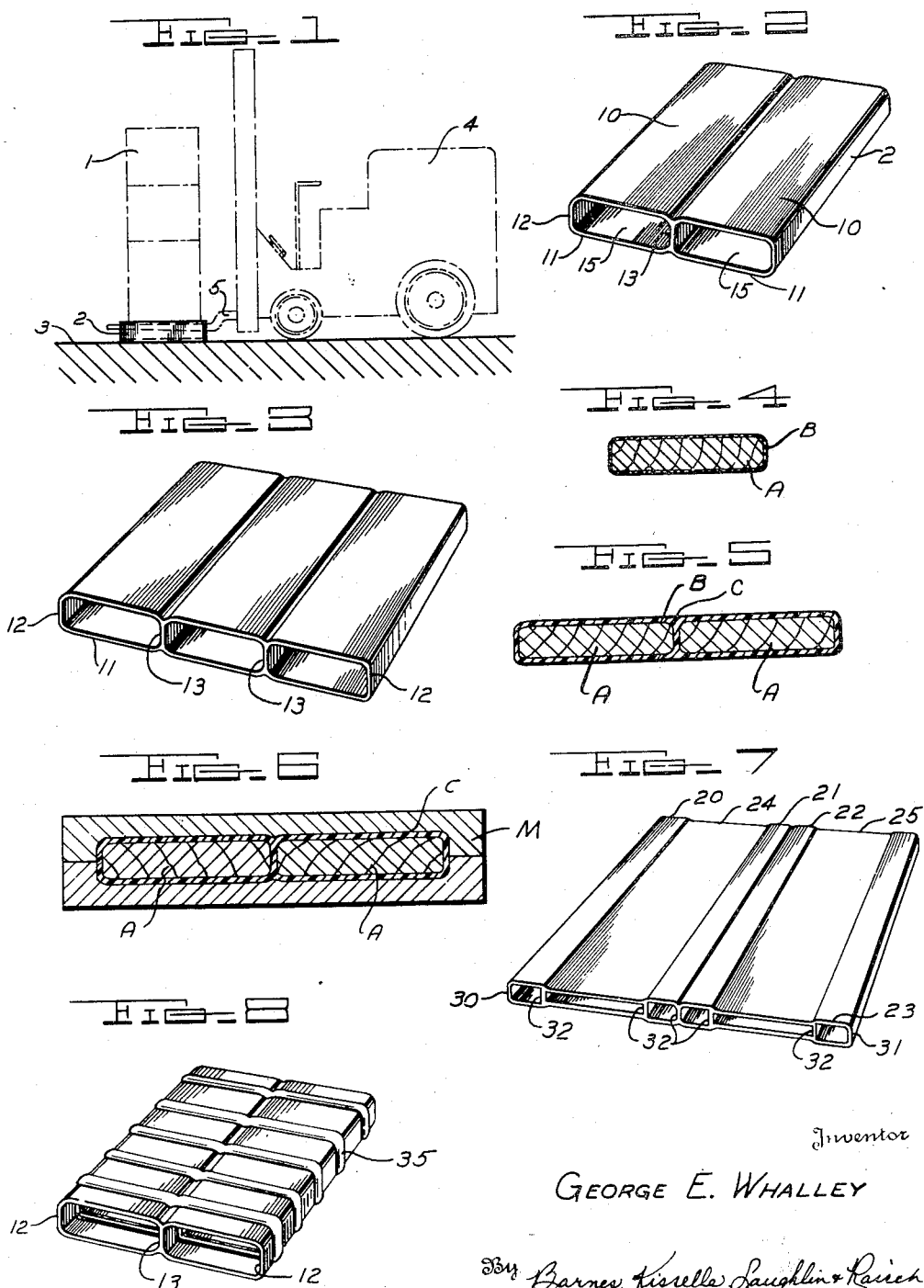

2,536,587

UNITED STATES PATENT OFFICE 2,536,587

PALLET

George E. Whalley, Detroit, Mich.

Application April 10, 1946, Serial No. 661,108

1 Claim. (Cl. 248—120)

This invention relates to devices which are generally termed pallets which are used in the transfer, shipping and storage of goods or merchandise.

Such pallets are employed in factories, warehouses, freight platforms and even in transporting vehicles, such as railroad cars, and they comprise generally a device upon which goods or merchandise are placed so that the goods are spaced somewhat above the supported floor with the pallet providing a passage or opening between the goods and the supporting floor. With this arrangement, a lifting device, such as a lift truck may be moved into position to pass a lifting fork or arm under the goods with the fork or arm passing into or through the opening in the pallet. Thus, the one or more articles on the pallet may be quickly and easily moved about by the transport truck or other machine to the end that much labor is saved and time is saved.

Some pallets have been employed heretofore but these have been made of wood and are cumbersome and are relatively short lived. It has also been proposed to make the pallets of metal such as sheet steel or the like but these are objectionable because of cost and weight.

The general objects of the invention are to provide a new and improved pallet formed into shape from a fibrous material and set by a plastic substance. Pallets thus constructed are of strong construction and long life and are relatively light in weight and otherwise generally handy and convenient to use. The invention also contemplates a method by which the pallets are made.

Other objects of the invention will be appreciated as the following detailed description is considered in conjunction with the accompanying drawings:

Fig. 1 is a somewhat diagrammatic view illustrating the manner of use of a pallet.

Fig. 2 is a view showing one form of pallet construction.

Fig. 3 is a view similar to Fig. 2 showing another form of pallet construction.

Fig. 4 is a cross sectional view illustrating a step in the making of the pallet.

Fig. 5 is a view showing a second step in the making of the pallet.

Fig. 6 is a cross sectional view showing the pallet being subjected to heat and pressure for finally forming and setting the same.

Fig. 7 is a view illustrating a modified form of the pallet.

Fig. 8 is a view illustrating a still further modified form illustrating a corrugated construction.

As shown in Fig. 1, there is some goods or merchandise, whatever it may be, illustrated as comprising boxes or containers 1 stacked upon each other with the lowermost container resting upon a pallet generally shown at 2, which may rest upon the supporting floor 3. A conveyor or truck is generally illustrated at 4 and which is provided with a lifting arm or fork construction 5. This lifting arm is vertically adjustable and it will be appreciated how the truck may be moved in position so that the lifting arm 5 is moved into or through the pallet and then elevated so that the goods may be transported. There is practically no limit as to where devices of this kind may be used and some of which places are mentioned above and include notably, factories, warehouses, and freight platforms. The goods or merchandise may be loaded into a freight car with the use of pallets and the freight shipped therewith so that the goods may quickly and easily be unloaded. Furthermore, any kind of goods or merchandise may be handled in this way.

A pallet constructed in accordance with the invention is shown in Fig. 2, the same being generally referenced 2 and it comprises upper surface portions 10 and lower surface portions 11 with end portions 12 and an intervening strut or re-enforcing portion 13. This provides a structure of hollow form having two hollow parts or divisions as shown at 15. The pallet is of course reversible as regards which is the upper and lower surfaces.

Now, a pallet thus constructed may be as large as desired and it may have as many divisions or compartments as desired, all of which may be judged and calculated by the class of goods to be handled. In some cases the goods to be handled may be fairly large and bulky and not too heavy and in other cases the goods may be small and compact and heavy and the pallet construction may be selected for the purpose. In Fig. 3 for example, a pallet is shown having three sections the same being otherwise constructed as the pallet shown in Fig. 2 and the same reference characters are applied to like parts.

In the making of the pallet construction, as shown in Figs. 2 and 3, the same is, according to this invention, formed of a suitable fabric or fiber. For example, paper may be employed or a woven fiber or cloth or, in some cases, a matted fibrous material. In any event, insofar as this disclosure is concerned, all of such substances may be considered fibrous.

The fibrous sheet material, such as paper, is first impregnated with or coated with a plastic substance such as one of the synthetic resins, a good example of which is phenolic resin. Phenolic resin sets with the application of heat and pressure. The sheet thus impregnated or coated with the plastic substance is wrapped around a suitable form or core A as illustrated in Fig. 4. The wrappings are continued until a desired thickness is attained. The wrappings are generally illustrated at B. In the making of a pallet of two sections, as shown in Fig. 2, two of such cores A, with their wrappings thereon, may be placed edge to edge as illustrated and then an outer wrapping of the impregnated or coated fibrous material is applied to the combined form as shown at C. This is continued until the desired thickness of the wrappings C is attained. Following this, the article is treated to cure and set the plastic and should the plastic be a phenolic resin or other substance which sets by the application of heat or pressure, the form may be placed in a suitable mold shown at M and subjected to pressure during the application of heat. This sets the plastic impregnated paper into the shape given thereto and after this curing operation the cores are removed and the result is a pallet constructed as shown in Fig. 2. It is within the invention to subject the individual sections as shown in Fig. 4 to heat and pressure and then after the sections are cured to place the sections in proximity as shown in Fig. 5 and apply the outer wrapping and then cure the outer wrapping by heat and pressure or other manner as required by the plastic employed.

As an example of how the pallet may be varied in design for different purposes, the modification shown in Fig. 7 may be considered. In this form there are four tubular supporting sections 20, 21, 22 and 23, each of which may be formed by wrapping the coated or impregnated fibrous material on a core, these sections being spaced apart by elongated tubular sections 24 and 25 which may be similarly formed. This provides an added number of vertical reinforcing portions such as the end walls 30 and 31 and the intervening struts or posts 32 which mark the division between the tubular forms. In this particular form the sections 24 and 25 have their vertical dimension less than the sections 20, 21, 22 and 23 so that only the latter sections carry the load.

If it is desired to further reinforce the construction, the wall sections defining the hollow structure may be corrugated as shown at 35 in Fig. 8. The form shown in Fig. 8 is otherwise like the form shown in Fig. 2 and the same reference characters are applied to like parts.

I claim:

A pallet comprising, a plurality of relatively flat hollow sections, each section being fashioned into form by a plurality of superposed windings of sheet fibrous material having a plastic substance applied thereto which sets by the application of heat and pressure, said sections being placed in edge to edge relationship, an outer covering for the sections comprising a plurality of wrappings of sheet fibrous material with plastic substance applied thereto and which substance sets by the application of heat and pressure, the adjacent edges of the sections being united by the plastic substance to form a strut extending across the hollow form and the plastic substance being set to hold the sections in permanent shape.

GEORGE E. WHALLEY.

REFERENCES CITED

The following references are of record in the file of this patent:

UNITED STATES PATENTS

| Number | Name | Date |
|---|---|---|
| 1,754,784 | Borsodi | Apr. 15, 1930 |
| 2,016,273 | Atwood | Oct. 8, 1935 |
| 2,029,048 | Atwood | Jan. 28, 1936 |
| 2,340,956 | Gillette | Feb. 8, 1944 |
| 2,388,730 | Fallert | Nov. 13, 1945 |
| 2,432,849 | Adams et al. | Dec. 16, 1947 |